(12) United States Patent
Kim

(10) Patent No.: US 11,564,419 B2
(45) Date of Patent: Jan. 31, 2023

(54) METHOD FOR ATTACHING NONSLIP MEMBERS TO BOTH SIDES OF SOCK

(71) Applicants: REXY CO., LTD., Seoul (KR); SUNG HWA TRADING CO., LTD., Seoul (KR)

(72) Inventor: Ju Yeong Kim, Seoul (KR)

(73) Assignees: REXY CO., LTD., Seoul (KR); SUNG HWA TRADING CO., LTD., Seoul (KR)

( * ) Notice: Subject to any disclaimer, the term of this patent is extended or adjusted under 35 U.S.C. 154(b) by 13 days.

(21) Appl. No.: 17/375,515

(22) Filed: Jul. 14, 2021

(65) Prior Publication Data
US 2021/0337884 A1   Nov. 4, 2021

Related U.S. Application Data

(62) Division of application No. 16/609,513, filed as application No. PCT/KR2019/007388 on Jun. 19, 2019, now abandoned.

(30) Foreign Application Priority Data

Jun. 19, 2018 (KR) .......................... 10-2018-0070397

(51) Int. Cl.
*B29C 43/14* (2006.01)
*A41B 11/00* (2006.01)
(Continued)

(52) U.S. Cl.
CPC ............ *A41B 11/008* (2013.01); *A41H 42/00* (2013.01); *A41B 2400/80* (2013.01);
(Continued)

(58) Field of Classification Search
CPC ........ A41H 42/00; B29C 41/20; B29C 41/22; B29C 41/24; B29C 2043/025; B29C 43/00; B29C 43/32; B29C 43/3205
See application file for complete search history.

(56) References Cited

U.S. PATENT DOCUMENTS

| 3,421,183 A | 1/1969 | Grimmeisen |
| 3,466,684 A | 9/1969 | Rollman |

(Continued)

FOREIGN PATENT DOCUMENTS

| KR | 10-0465775 B1 | 1/2005 |
| KR | 10-0544057 B1 | 1/2006 |

(Continued)

OTHER PUBLICATIONS

Korean Office Action for corresponding Korean application No. 10-2018-0070397 dated Mar. 21, 2019, citing the above references.
(Continued)

*Primary Examiner* — Joseph S Del Sole
*Assistant Examiner* — Thu-Khanh T. Nguyen
(74) *Attorney, Agent, or Firm* — Hauptman Ham, LLP

(57) ABSTRACT

The present invention relates to a method and a structure for attaching nonslip members to both sides of a sock, in which nonslip members having a variety of patterns may be firmly attached to an inner side and an outer side of a sock, which need a nonslip member, using a mold, the nonslip member includes air holes to be smoothly ventilated, and a size of the nonslip member is adequately adjusted according to a thickness and an area of the mold.

1 Claim, 17 Drawing Sheets

(51) Int. Cl.
*A41H 42/00* (2006.01)
*B29C 43/02* (2006.01)
*B29C 43/04* (2006.01)
*B29C 43/36* (2006.01)
*B29L 31/48* (2006.01)

(52) U.S. Cl.
CPC .. *B29C 2043/025* (2013.01); *B29C 2043/043* (2013.01); *B29C 2043/3665* (2013.01); *B29L 2031/48* (2013.01)

(56) References Cited

U.S. PATENT DOCUMENTS

| | | | |
|---|---|---|---|
| 9,038,201 B2 * | 5/2015 | Lee | A61H 7/007 2/239 |
| 2008/0032056 A1 * | 2/2008 | Whang | B29C 41/22 427/407.1 |
| 2010/0011624 A1 | 1/2010 | Polegato Moretti | |
| 2016/0278471 A1 | 9/2016 | Rossignoli et al. | |

FOREIGN PATENT DOCUMENTS

| | | |
|---|---|---|
| KR | 10-1176866 B1 | 8/2012 |
| KR | 10-2012-0121046 A | 11/2012 |
| KR | 10-2013-0072858 A | 7/2013 |
| KR | 10-1438186 B1 | 9/2014 |
| KR | 20-0480796 Y1 | 7/2016 |
| KR | 10-1809416 B1 | 12/2017 |

OTHER PUBLICATIONS

Korean Decision to Grant Patent dated Jul. 2, 2019, in connection with the Korean Patent Application No. 10-2018-0070397 citing the above references.

* cited by examiner

METHOD FOR ATTACHING NONSLIP MEMBERS TO BOTH SIDES OF SOCK

CROSS REFERENCE TO RELATED APPLICATION

This present application is a Divisional Application of U.S. patent application Ser. No. 16/609,513, filed on Oct. 30, 2019, which is a national stage filing under 35 U.S.C § 371 of PCT application number PCT/KR2019/007388 filed on Jun. 19, 2019 which is based upon and claims the benefit of priority to Korean Patent Application No. 10-2018-0070397 filed on Jun. 19, 2018 in the Korean Intellectual Property Office. The disclosures of the above-listed applications are hereby incorporated by reference herein in their entirety.

TECHNICAL FIELD

The present invention relates to a method and a structure for attaching nonslip members to both sides of a sock, and more particularly, to a method and a structure for attaching nonslip members to both sides of a sock, in which nonslip members having a variety of patterns are firmly attached to an inner side and an outer side or a part of the outer side of each of a variety of types of sport socks which needs the nonslip member using a mold, the nonslip member includes air holes to be smoothly ventilated, a thickness and a size of the nonslip member are adequately adjusted according to a thickness and an area of the mold so that the nonslip member having a cushion is formed at a part of the sock where a bottom of a wearer's foot rubs the ground so as to prevent occurrence of blisters.

BACKGROUND ART

Generally, socks are worn on feet to protect and warm wearer's feet. Recently, in addition to simple basic functions, a variety of types of functional socks for the purpose of being used for climbing, sports, fashions, and the like have been sold on the market.

When playing soccer, basketball, and volleyball, running a marathon, marching, and the like, blisters are generated due to rubbing between a sock and a bottom of a foot. Since many blisters are generated in exercise events which require a great deal of sprinting, quick stops, and changes of direction as a main event, it is very important to prevent slips between a foot and a sock and the sock and a shoe during exercise. Particularly, in a timed event such as a marathon, running, and the like, tennis, basketball, soccer, and the like which require agility, and exercise events with a large number of repetitions such as long-distance walking, long-distance climbing, and the like, nonslip member between a foot and a sock and nonslip member between the sock and a shoe are very important in safe and quick changes in direction, stops, starts, and the like. In a golf swing, antislip is very important for maintaining a stable swing posture and increasing impact power by preventing slipping of a bottom of a left foot or a right foot on which a load is concentrated so as to effectively perform the golf swing. That is, in all types of exercises, antislip is essential in order to maximize an effect of exercise or to protect a player's body.

The nonslip member not only reduces a loss of power during an exercising process and effectively uses power but also prevents a foot and an ankle from tilting back and forth due to an exercising force and being exhausted or sore. Particularly, the nonslip member is more necessary for people who seriously exercise, such as soldiers who march a long distance and professional players who exercise professionally, and fitness enthusiasts and the like who exercise significantly more than ordinary people. As an example, an athlete, Hyun Jeong, withdrew from the Australian Open in 2018 due to a foot injury caused by blisters on the bottom of his foot. There are many causes of generating blisters on a foot, but mostly, blisters are generated by repetitive rubbing, chafing, and jamming phenomena occurring between a shoe and a sock. Dermis is separated from epidermis due to friction transferred to the skin of a bottom of a foot, that is, a shearing force, and a body fluid leaks therebetween and forms blisters.

Meanwhile, in the following patent document, an existing single-side nonslip member bottom disclosed in Korean Patent Registration No. 10-1176866 has an effect of strengthening grip between a floor and a sock by attaching a nonslip member to an outer side of the sock but cannot resolve slipping between the sock and a foot. Also, there are problems such as a phenomenon wherein the sock is pulled backward and a phenomenon wherein the foot and sock slip due to the grip between the floor and the sock, and in a severe situation, the sock is folded. Particularly, since an inner side of a sport pile sock is formed as a pile structure on which forming a nonslip member structure is impossible, currently released sport socks are limited to having a single nonslip member material on an outer side.

To this end, Korean Patent Registration No. 10-1438186 discloses an antislip type sock for exercise, in which an antislip portion formed of silicone is provided on a part which protrudes from a bottom of a foot below a big toe that may be an impact point and in which a force is intensively concentrated during exercise so as to prevent slipping during a variety of exercise events.

Also, in the following patent document, Korean Patent Publication No. 10-2012-0121046 discloses a sock having an acupressure function, in which an acupressure protrusion capable of practicing acupressure treatment is formed on an inner side of a sock so that the acupressure protrusion protruding from the inner side of the sock delivers a stimulus to an acupuncture point of a toe or a bottom of a foot so as to practice acupressure treatment to facilitate blood circulation and allow each body part to be healthy.

Also, in the following patent document, Korean Utility Model Registration No. 20-0480796 discloses a safe sport sock having a particular functionality capable of protecting a toenail, a toe ligament, muscle, and a joint from a pressure, a shock, vibrations caused by an external force and of a ball and friction therebetween, being stepped by an opponent's foot, or the like and capable of preventing a phenomenon in which a foot slips in a shoe and is pushed or tilts toward any side.

However, conventionally, since a nonslip member is attached to a desired position of an inner side or outer side of a sock using a sticker-type patch, silk printing, silicone coating, or the like, it is structurally impossible to firmly attach a nonslip member to a sock and there is a problem in which the nonslip member is easily separated. Particularly, since the inner side of the sock is fluffy, it is difficult to attach the nonslip member to the inner side of the sock. Accordingly, the nonslip member is easily separated from the sock while being washed.

Also, conventionally, since a nonslip member part is not ventilated, a foot sweats a lot and becomes wet. When the nonslip member is wet with sweat, a water membrane is formed and slipping occurs such that a nonslip member function is destroyed.

Also, conventionally, since a nonslip member is manufactured with a uniform thickness and a uniform area and is attached or a nonslip member is attached through silk printing or silicone coating with a uniform thickness and a uniform area, it is structurally impossible to adequately adjust a thickness and a size of the nonslip member.

Recently, although double-sided nonslip member socks have been developed or released in some domestic or foreign sport brands, manufacturing costs and selling prices are very high such that consumer accessibility is low and there are problems in hygroscopicity, durability, applicability of design, and the like. As an example, both-sided nonslip member socks have become known to consumers due to releasing of Trusox but are low in accessibility due to a slightly high price range and are not popularized due to a limitation in workability and a restriction in design so as to be used only as products for professional athletes or sports enthusiasts.

RELATED PATENT DOCUMENT (Patent Document 0001) Patent Document 1: Korean Patent Registration No. 10-1176866 (registered on Aug. 20, 2012)

(Patent Document 0002) Patent Document 2: Korean Patent Registration No. 10-1438186 (registered on Aug. 29, 2014)

(Patent Document 0003) Patent Document 3: Korean Patent Publication No. 10-2012-0121046 (published on Nov. 5, 2012)

(Patent Document 0004) Patent Document 4: Korean Utility Model Registration No. 20-0480796 (registered on Jul. 1, 2016)

DISCLOSURE

Technical Problem

The present invention is directed to providing a method and a structure for attaching a nonslip member to each of both sides of a sock, which allow nonslip members having a variety of patterns to be firmly attached to parts of an inner side and an outer side of a sock which need a nonslip member and allow a nonslip member to be firmly attached to the inner side of the sock which is fluffy.

The present invention is also directed to providing a method and a structure for attaching a nonslip member to each of both sides of a sock, in which a plurality of air holes are formed in the nonslip member to be smoothly ventilated so as to prevent the nonslip member from becoming wet with sweat.

The present invention is also directed to providing a method and a structure for attaching a nonslip member to each of both sides of a sock in which a nonslip member is attached using a mold to be firm and durable while simultaneously a thickness, a size, and a position of the nonslip member are adequately adjustable using a mold according to a thickness and an area.

The present invention is also directed to providing a method and a structure for attaching a nonslip member to each of both sides of a sock in which a stable posture is maintained by strengthening grip with a frictional surface according to a posture during exercise, blisters generated by friction between a bottom of a foot and a contact surface with a ground are prevented by reducing a frictional coefficient generated according to each of a variety of exercise events, and disadvantages of an existing double-sided nonslip technique are simultaneously remedied and workability thereof is improved so as to supply products with high quality and a competitive price to consumers.

The present invention is also directed to providing a method and a structure of attaching a nonslip member to each of both sides of a sock capable of completely remedying conventional problems including not only poor grip between the sock and a shoe but also a slipping phenomenon between a foot and the sock, providing a great effect in strengthening performance by increasing a sense of contact with a shoe during sport activities, reducing manufacturing costs so as to have excellent price competitiveness, durability, and being modifiable into a variety of designs.

Technical Solution

One aspect of the present invention provides a method of attaching nonslip member to both sides of a sock. The method includes manufacturing a mold including a nonslip member molding groove formed to attach a desired-patterned nonslip member to a part of a sock which needs a nonslip member, inserting silicone which is a raw material of the nonslip member into the nonslip member molding groove of the mold, melting the silicone by inserting the mold into a heating device, placing the mold turned upside down on the sock to allow the silicone melted in the heating device to come into contact with a nonslip member attachment part of the sock and placing the mold on the sock on a lower fixing plate of a press, and attaching the nonslip member formed of silicone to the sock by heat-pressing the mold using an upper pressing plate of the press.

The nonslip member molding groove of the mold may include a plurality of air hole molding pins, and the nonslip member may include a plurality of air holes formed by the air hole molding pins.

The nonslip member may be attached to any one of an inner side and an outer side of the sock or attached to each of the inner side and outer side.

Another aspect of the present invention provides a structure for attaching a nonslip member to each of both sides of a sock. In the structure, a nonslip member molding groove is formed in a mold configured to attach a desired-patterned nonslip member to a part of a sock which needs a nonslip member, silicone which is a raw material of the nonslip member is inserted into the nonslip member molding groove of the mold, melting the silicone by inserting the mold into a heating device, the mold turned upside down is placed on the sock to allow the silicone melted in the heating device to come into contact with a nonslip member attachment part of the sock and is inserted into a lower fixing plate of a press (not shown), and the nonslip member formed of silicone is attached to the sock by heat-pressing the mold using an upper pressing plate of the press.

The nonslip member may include a plurality of air holes.

The nonslip member may be attached to any one of an inner side and an outer side of the sock or attached to each of the inner side and outer side.

Advantageous Effects

In a method and a structure for attaching a nonslip member to each of both sides of a sock according to the present invention, since a nonslip member formed of silicone is attached by heat-pressing a mold in which silicone is inserted to a sock, it is structurally possible to firmly attach nonslip members having a variety of patterns to parts of an inner side and an outer side of the sock which need a nonslip member using a mold. Particularly, since melted silicone is heat-pressed against the sock, a nonslip member is firmly attachable even to the inside of the sock which is fluffy and the nonslip member is not separated from the sock while being washed.

Also, since a plurality of air holes are formed in the nonslip member attached to the sock so as to be smoothly ventilated, it is possible to prevent the nonslip member from being wet during exercise and prevent a water membrane from being formed on the nonslip member which destroys or degrades the nonslip member function.

Also, since silicone inserted into a nonslip member molding groove of a mold is attached to a sock to form a nonslip member thereon, there is present a structural effect of adequately adjusting a size of the nonslip member according to a thickness and an area of the nonslip member molding groove formed in the mold.

Also, since it is possible to attach the nonslip member to a rubbed part of a bottom of a foot according to an exercise event, there are effects of preventing blisters by decreasing a frictional coefficient generated for each of a variety of exercise events during exercise, preventing distortions of the foot and the sock by applying the nonslip member to a sport sock during exercise, and supplying improved workability and high quality at a competitive price to consumers.

MODES OF THE INVENTION

Hereinafter, technical components of the present invention will be described in detail with reference to the attached drawings.

A method of attaching a nonslip member to both sides of a sock according to the present invention, as shown in FIGS. 1 to 4M as basic features of the technical components thereof, includes manufacturing a mold 100 including a nonslip member molding groove 110 formed to attach a desired-patterned nonslip member 20 to a part of a sock 10 which needs a nonslip member, inserting silicone which is a raw material of the nonslip member 20 into the nonslip member molding groove 110 of the mold, melting the silicone by inserting the mold 100 into a heating device (not shown), placing the mold 100 turned upside down on the sock 10 to allow the silicone melted in the heating device to come into contact with a nonslip member attachment part of the sock 10 and inserting the mold on the sock into a lower fixing plate of a press (not shown), and attaching the nonslip member 20 formed of silicone to the sock 10 by heat-pressing the mold 100 using an upper pressing plate of the press.

The method of attaching the nonslip members to both sides of the sock according to the present invention will be described in detail for each operation as follows.

(First Process)

Figure 1:
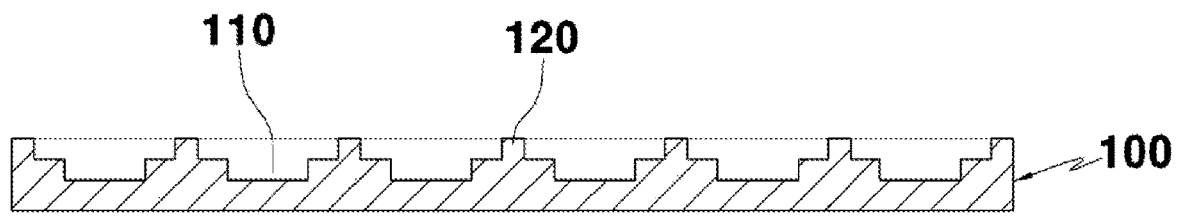
FIG. 1 is a cross-sectional view of a mold according to the present invention.

A first process, as shown in FIG. 1, is a process of manufacturing the mold 100 including the nonslip member molding groove 110 configured to attach the nonslip member 20 having a desired pattern to a part of the sock 10 which needs a nonslip member. Through the first process, the nonslip member molding grooves 110 having a variety of patterns are formed in the mold 100. Here, each of the nonslip member molding grooves 110 having the variety of patterns may be formed in the mold 100. Also, the nonslip member molding grooves 110 of the mold 100 which have a variety of sizes with different thicknesses and areas are each formed so as to adequately adjust a thickness and a size of the nonslip member 20. That is, in the case of the nonslip members 20 attached to a front side, a rear side, an inner side, an outer side, and the like of a bottom of the sock 10, a thickness of the nonslip member molding groove 110 may be formed to be small. In the case of the nonslip members 20 attached to an arch part and the like of the sock 10, a thickness of the nonslip member molding groove 110 may be formed to be large.

The present invention is provided to install the nonslip members 20 on the inner and outer sides of the sock 10. A molding position and a thickness of the nonslip member 20 depend on an event of sport and thus the nonslip member is manufactured at a place corresponding to a ground-contact position of a bottom of a foot. A method of molding the nonslip member 20 on the sock 10 is performed using the same method as described above.

Although FIG. 1 illustrates a cross section of the nonslip member molding groove 110 of the mold according to one embodiment of the present invention, the nonslip member molding groove 110 of the mold 100 is not limited to that shown in FIG. 1. That is, a variety of such nonslip member molding grooves 110 of the mold 100 according to the present invention may be formed.

Figure 3A:
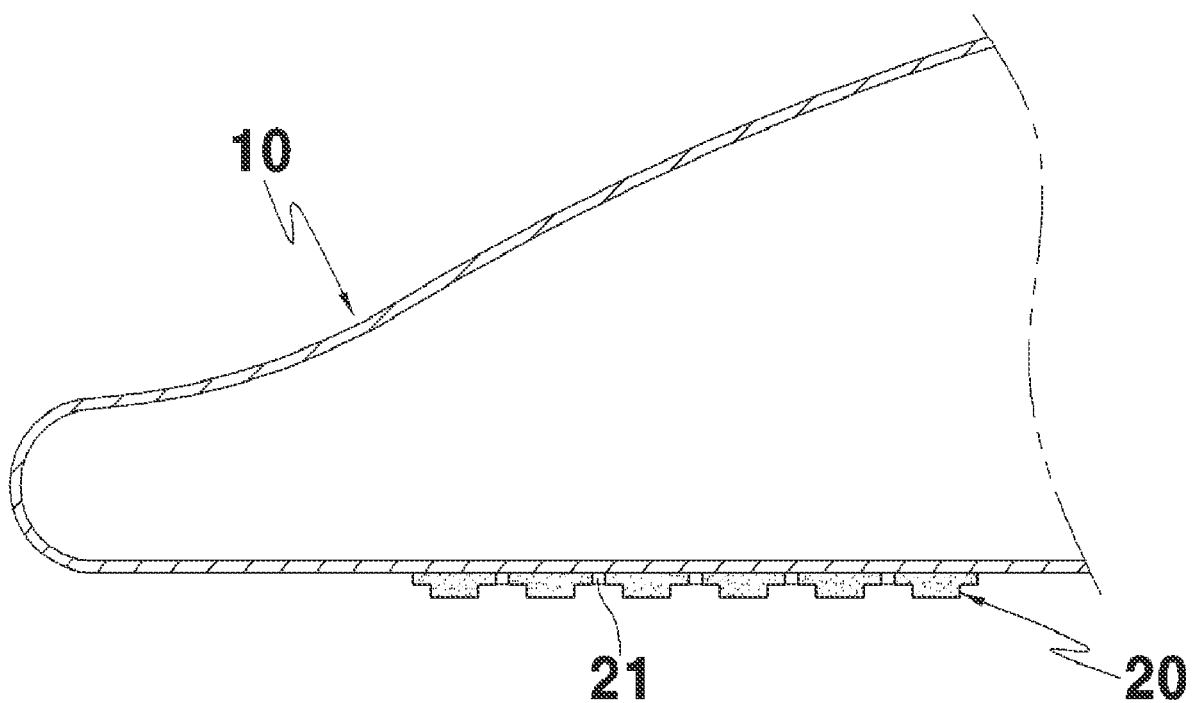
FIGS. 3A, 3B, and 3C are cross-sectional views illustrating states in which a nonslip member is attached to a sock according to the present invention.
Figure 3B:
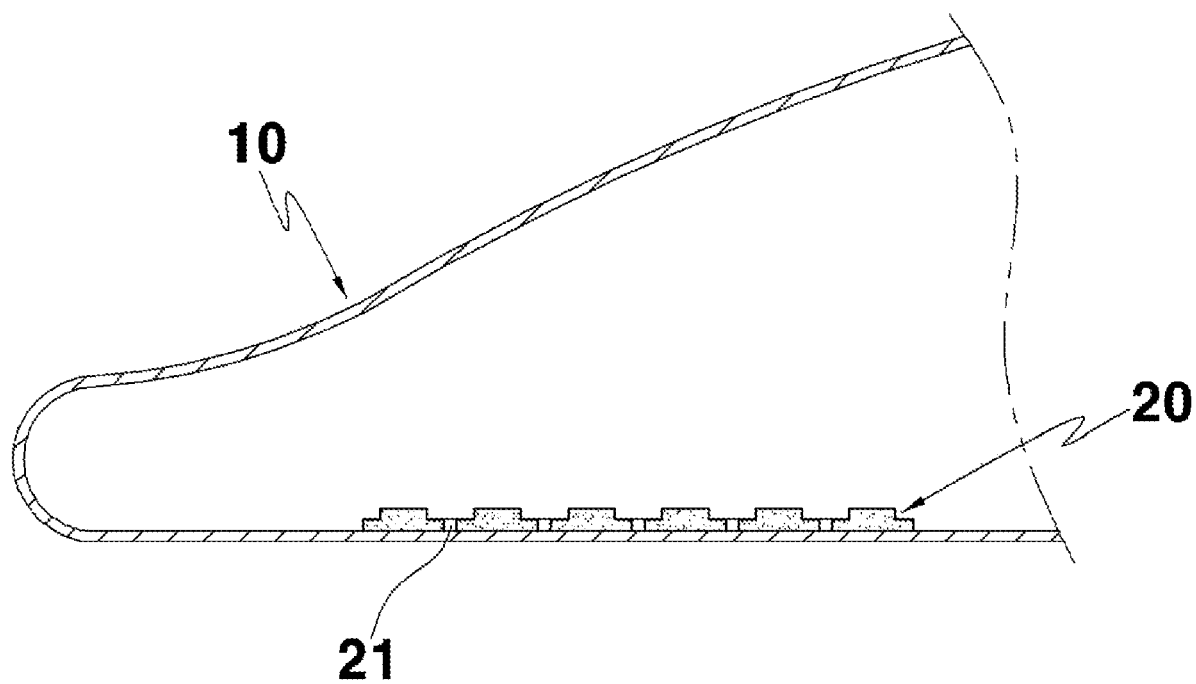
Figure 3C:
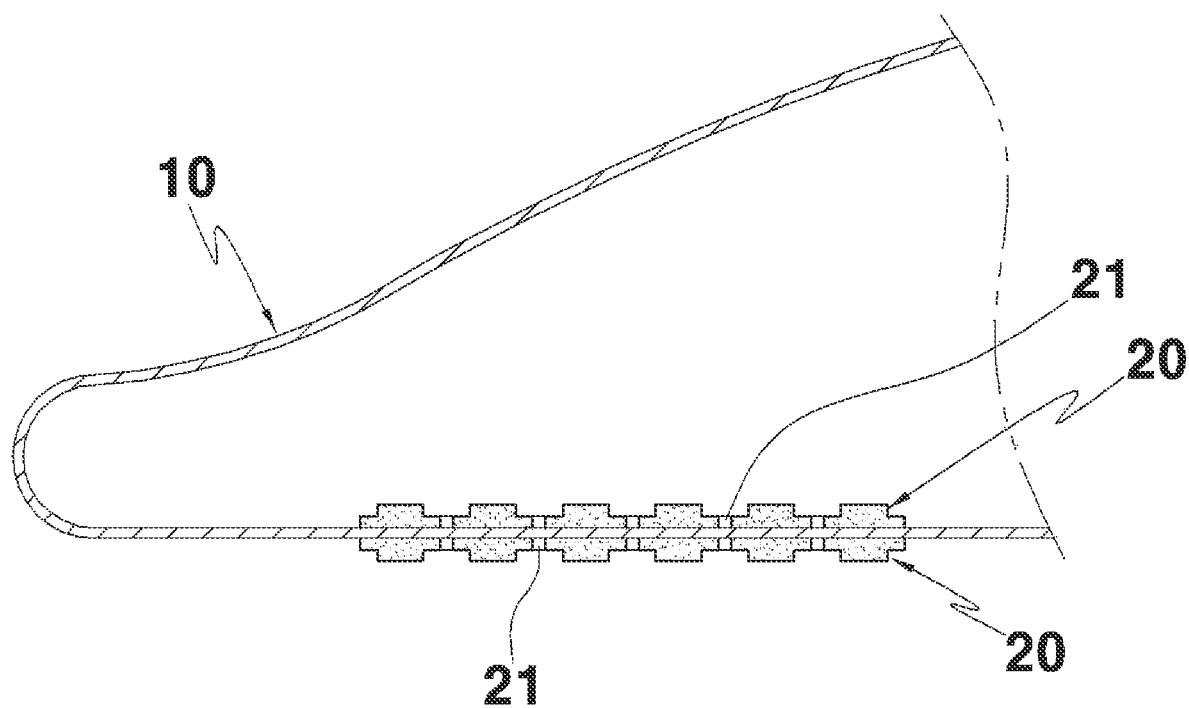
Figure 4A:
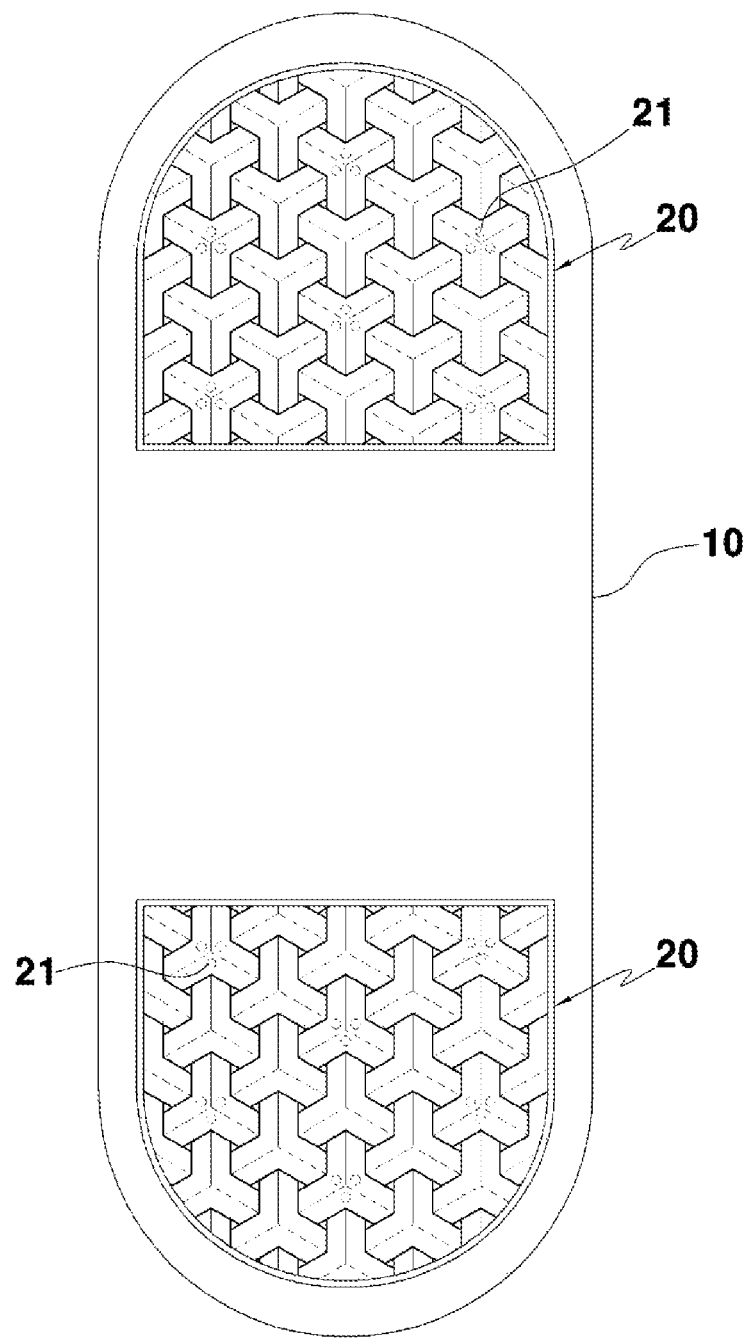
FIG. 4A to 4M are exemplary views illustrating a variety of embodiments of a nonslip member according to the present invention.
Figure 4B:
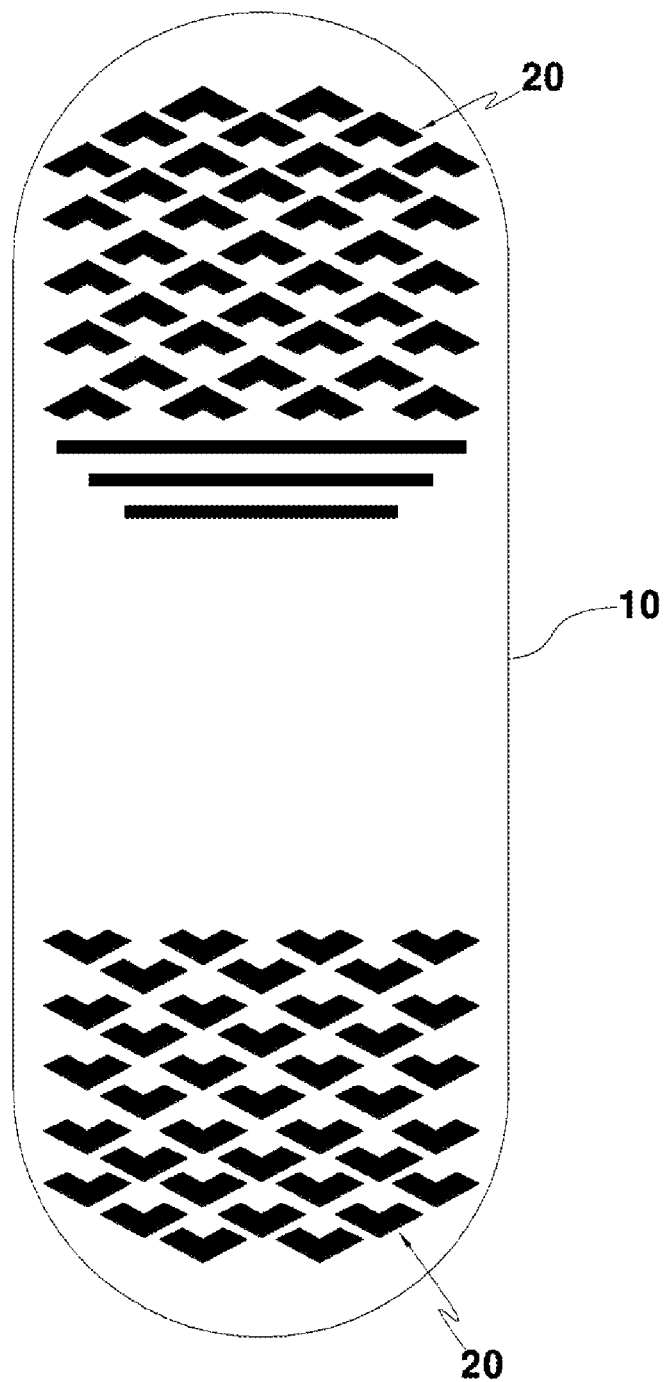
Figure 4C:
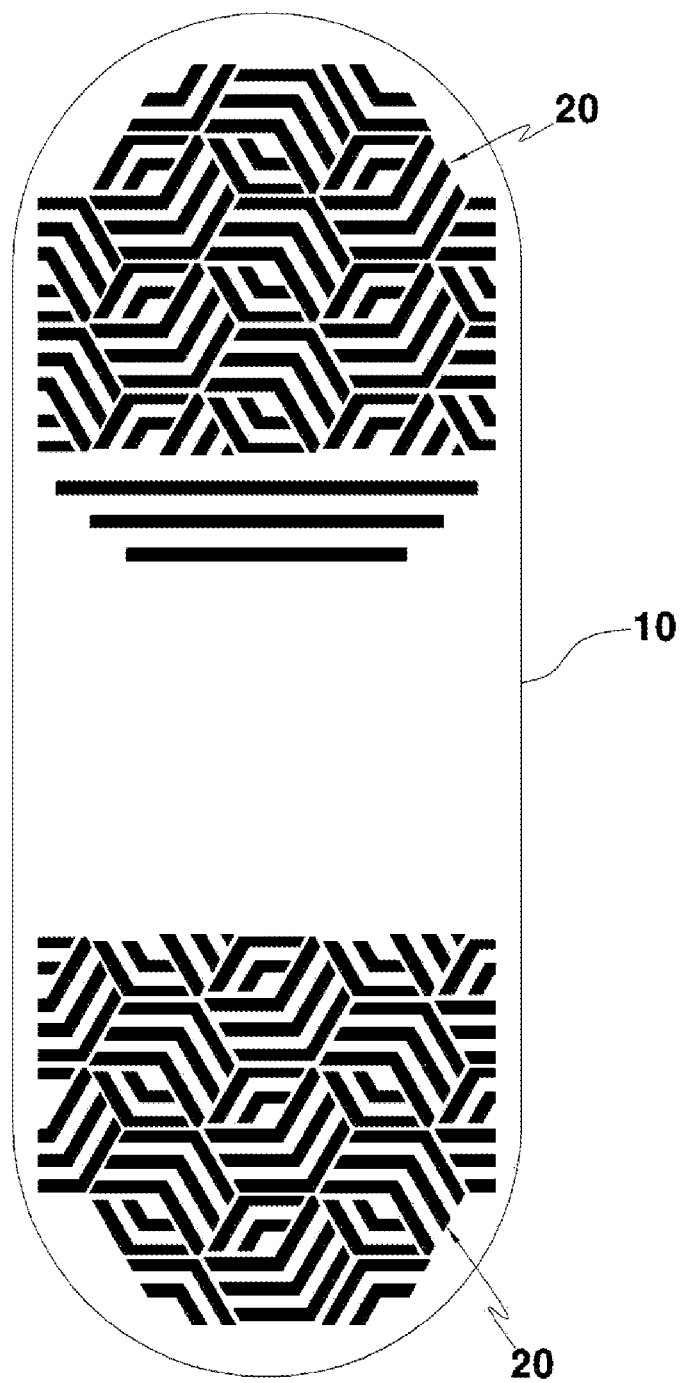
Figure 4D:
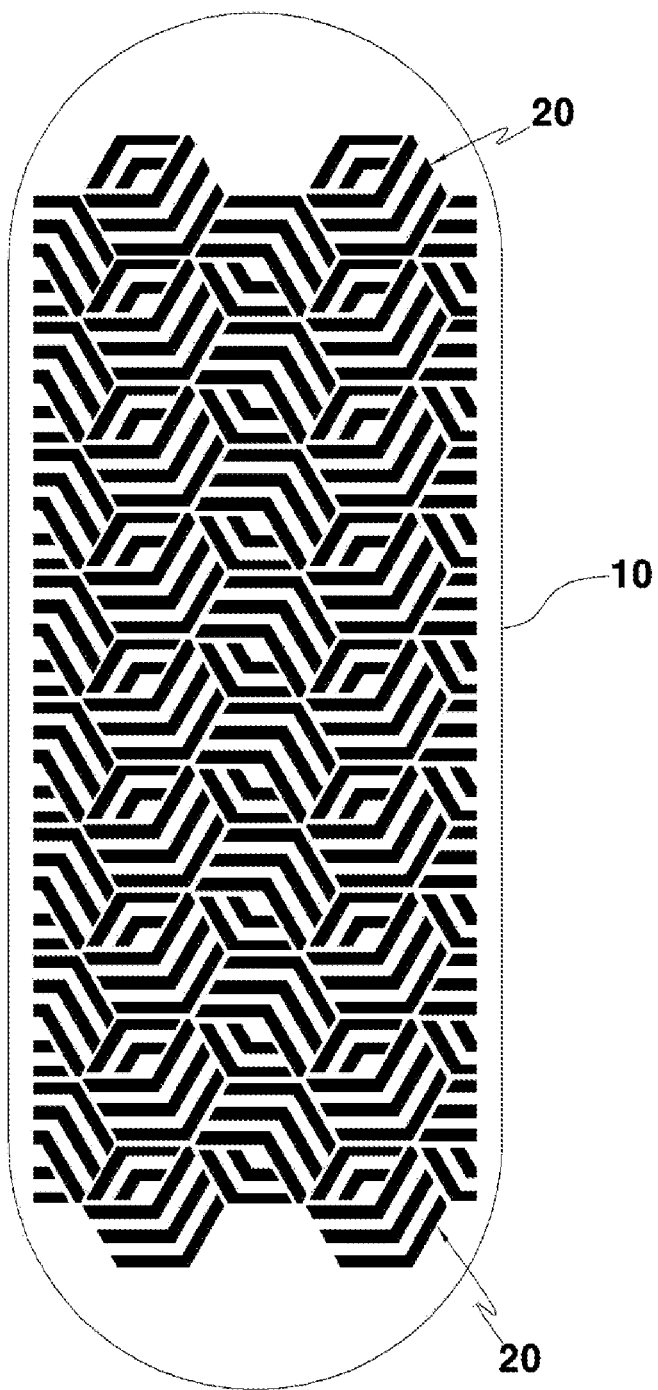
Figure 4E:
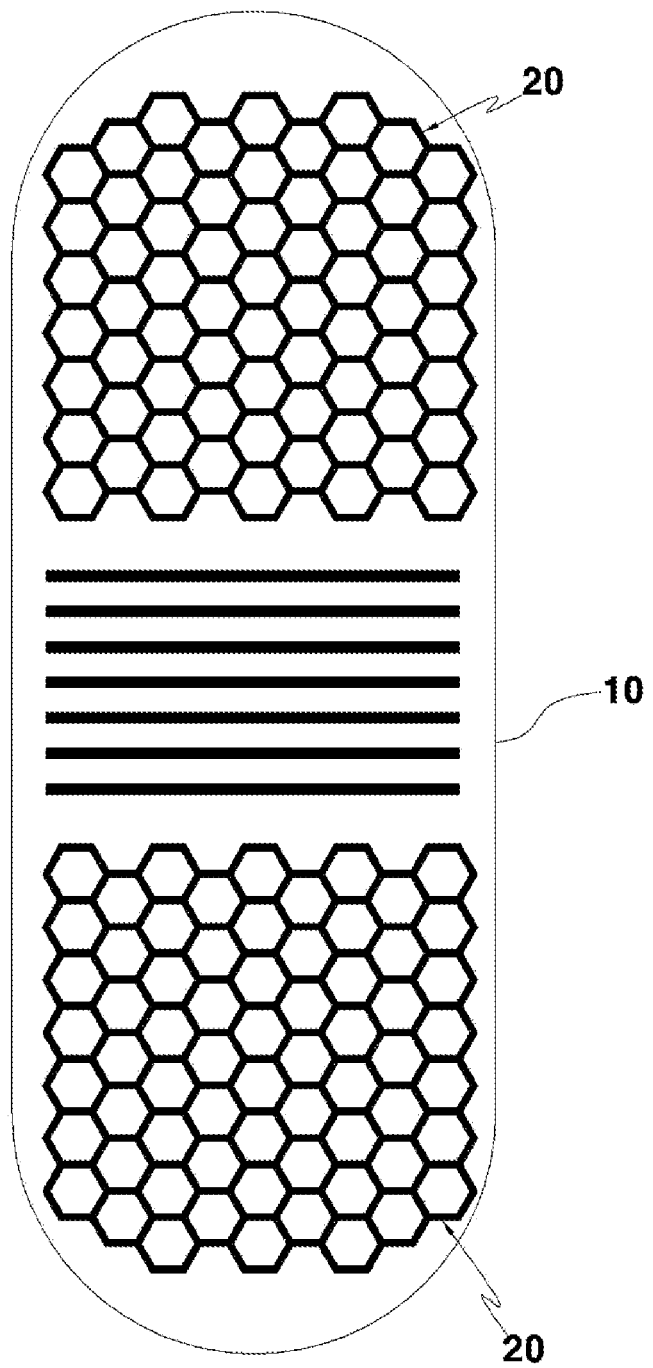
Figure 4F:
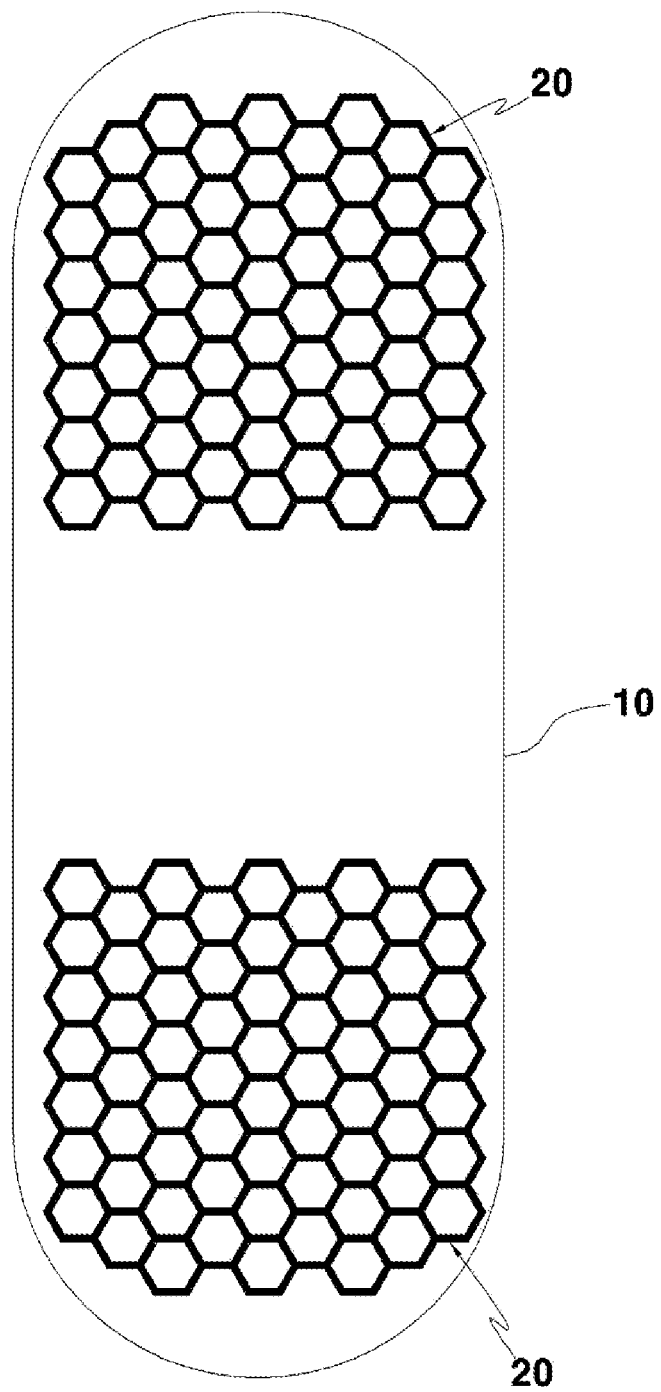
Figure 4G:
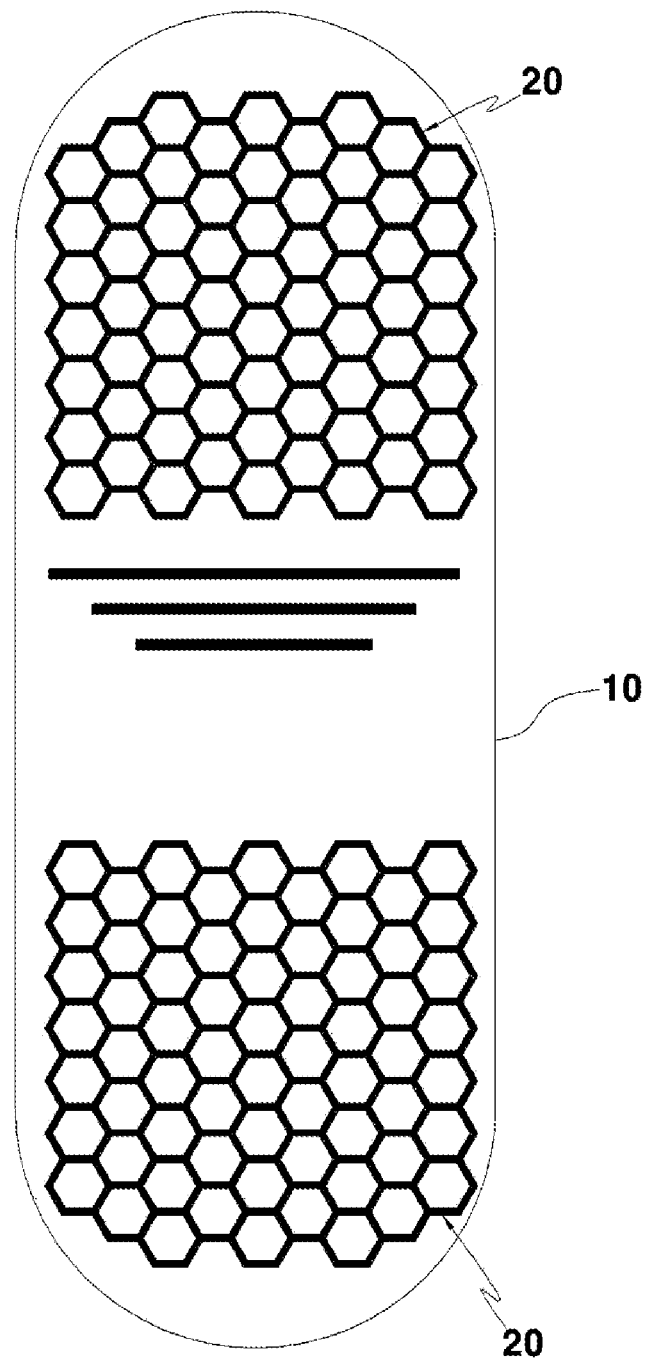
Figure 4H:
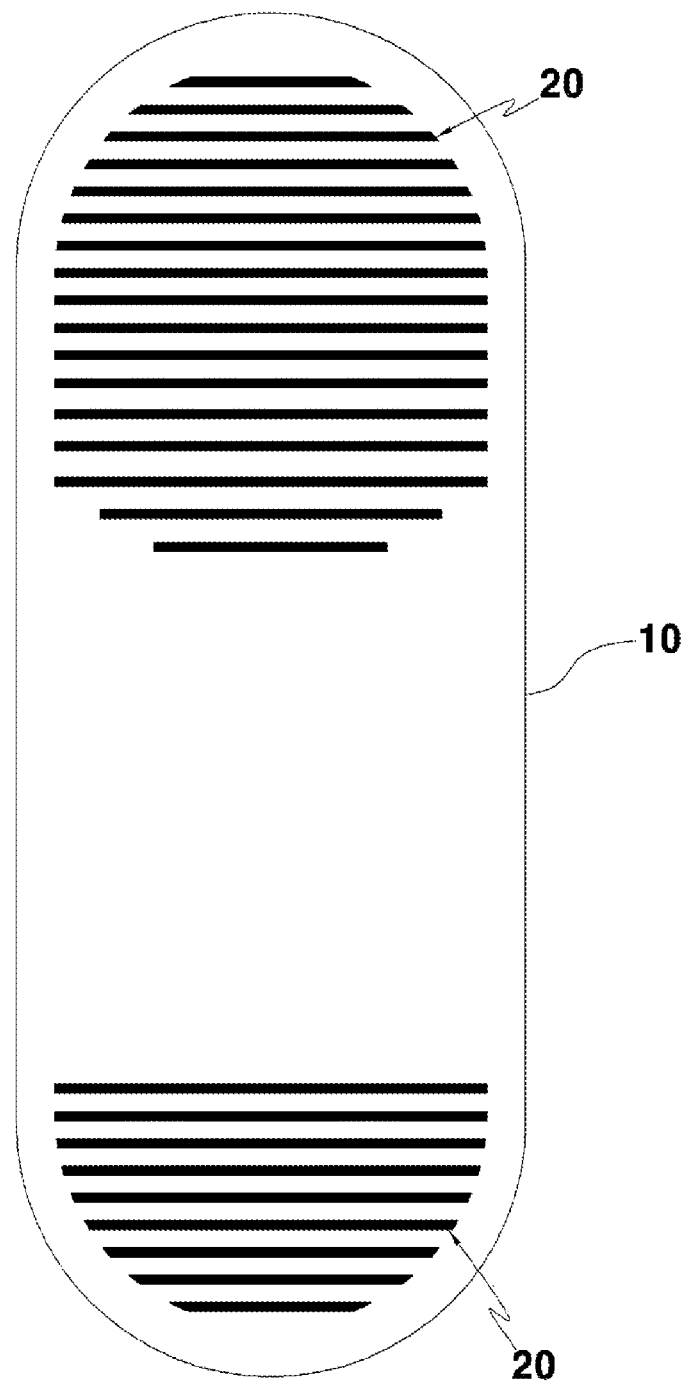
Figure 4I:
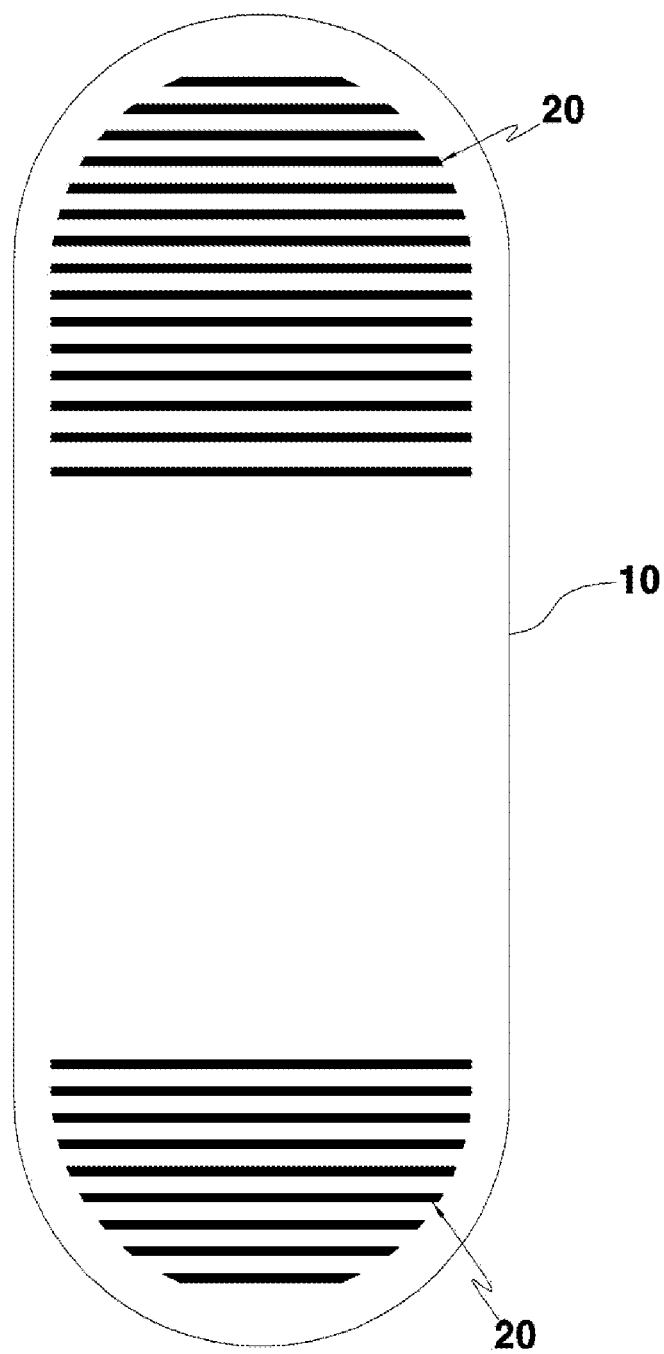
Figure 4J:
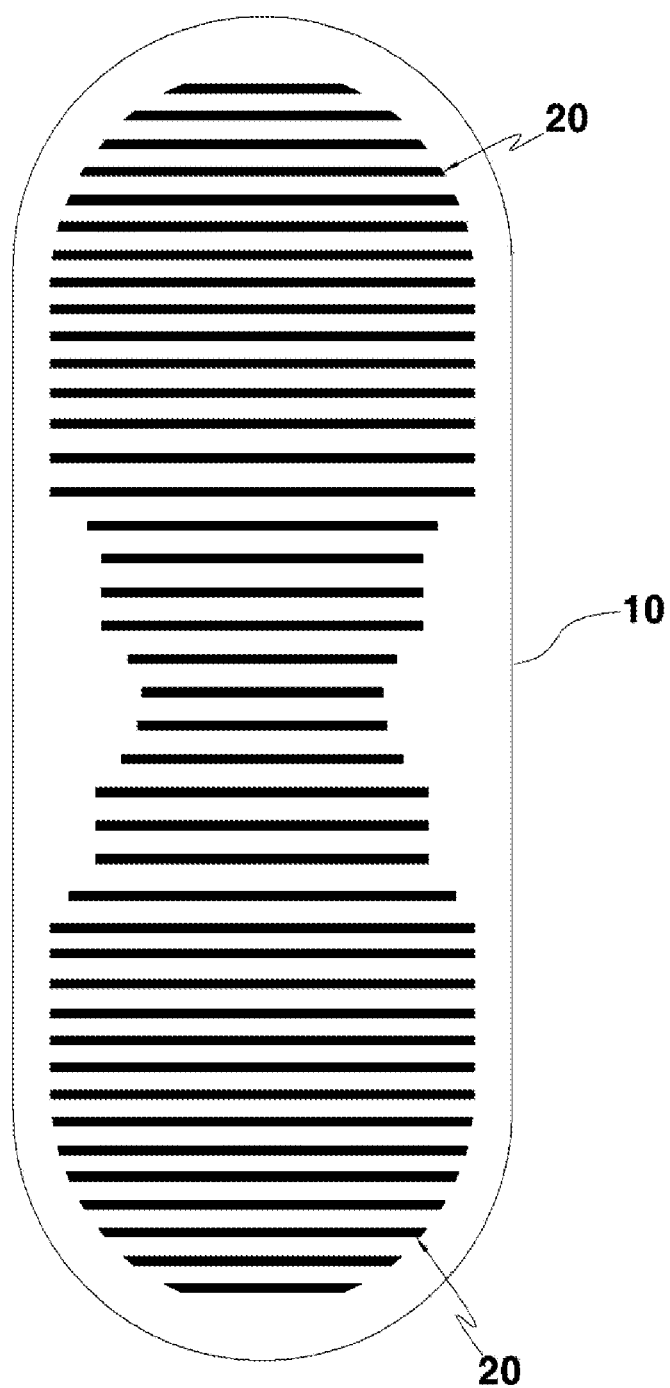
Figure 4K:
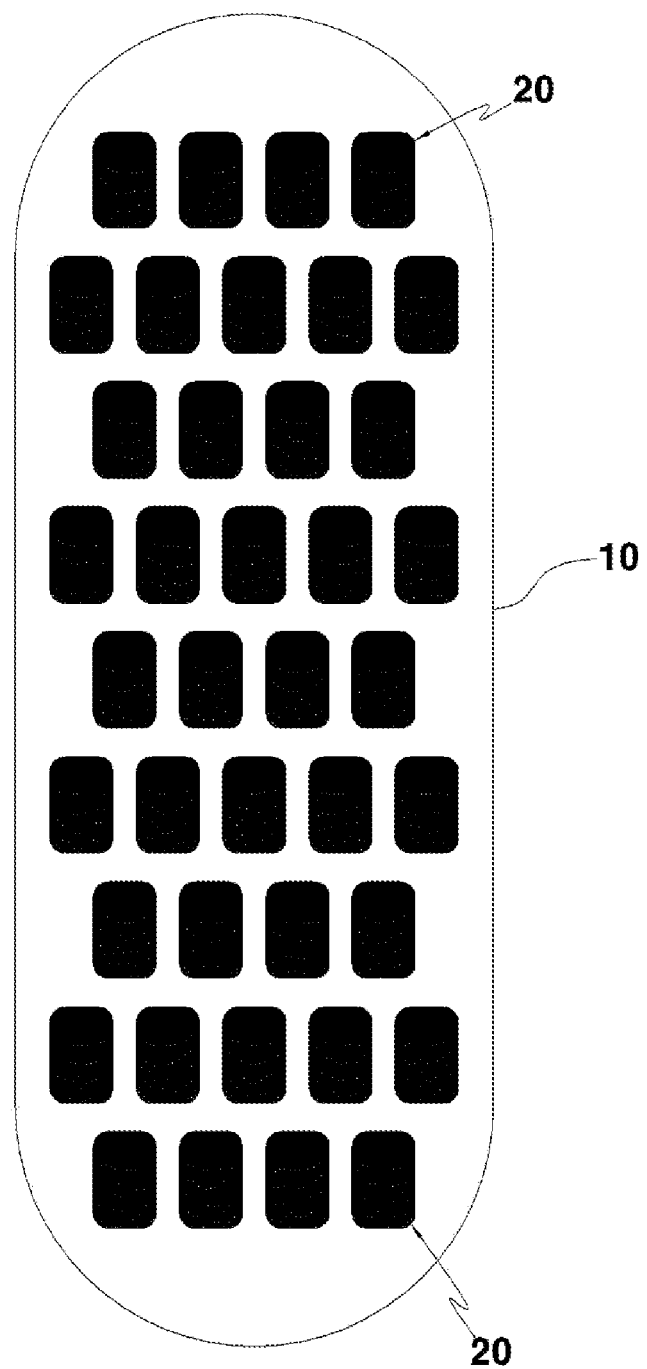
Figure 4L:
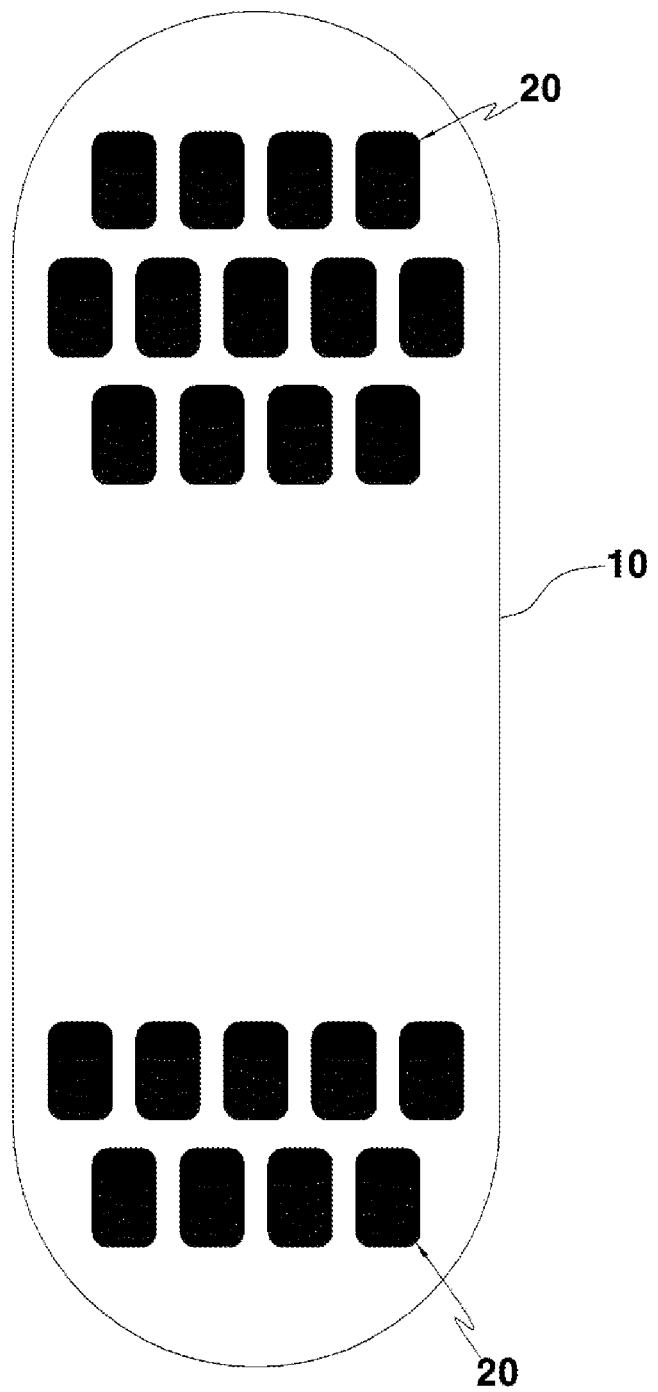
Figure 4M:
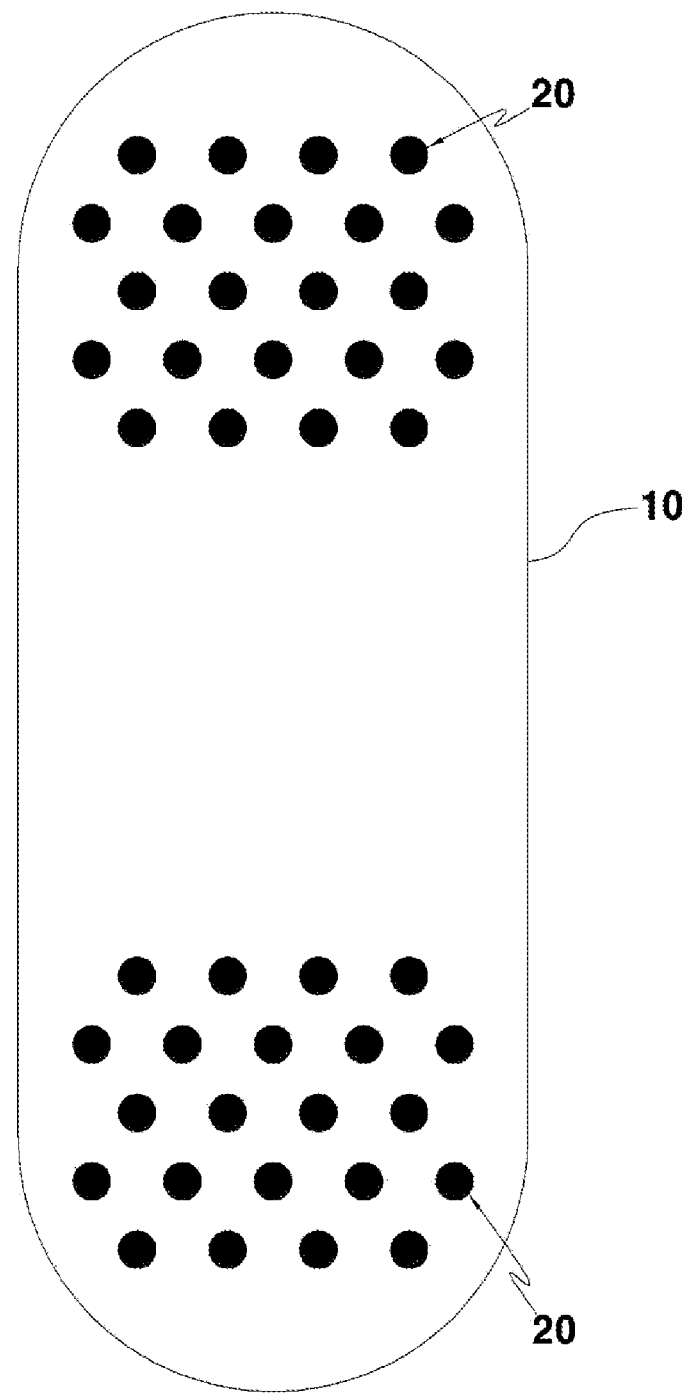

According to the present invention, the nonslip member molding groove 110 of the mold 100 includes a plurality of air hole molding pins 120, as shown in FIG. 1, so that the nonslip member 20 includes a plurality of air holes 21 formed by the air hole molding pins 120 to be smoothly ventilated as shown in FIGS. 3A, 3B, and 3C. Here, the air hole molding pins 120 may be formed to have a variety of shapes.

(Second Process)

Figure 2:
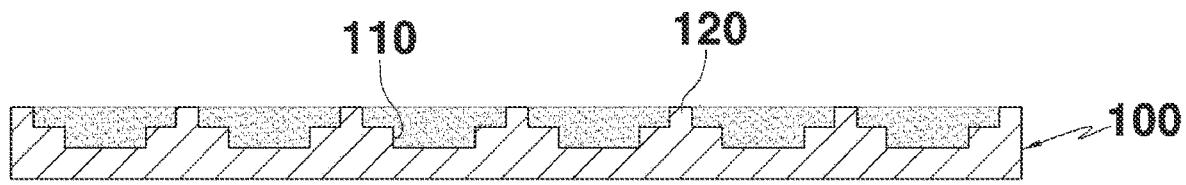
FIG. 2 is a cross-sectional view illustrating a state in which silicone is inserted into the mold according to the present invention.

A second process is a process of inserting silicone which is a raw material of the nonslip member 20 into the nonslip member molding groove 110 of the mold 100 as shown in FIG. 2. Through the second process, the silicone which is a raw material of the nonslip member 20 is inserted into the nonslip member molding groove 110 of the mold 100.

(Third Process)

A third process is a process of inserting the mold 100 into the heating device and melting the silicone. Through the third process, the silicone inserted into the nonslip member molding groove 110 of the mold 100 is melted to be firmly attached to the inner side and the outer side of the sock 10. Here, when the silicone which is melted while being injected into the nonslip member molding groove 110 is solidified, the silicone is formed as the nonslip member 20.

A support which supports a plurality of such molds 100 is installed in the heating device to be withdrawable like a drawer. A handle is provided on a front side of the support, a heating plate including a heater is installed above the support, and a control portion is installed below the heating device to control a temperature and the like of the heater.

Accordingly, when the plurality of molds are placed on the support while the support is withdrawn outside the heating device and the support is pushed into the heating device, the silicone inserted into the nonslip member molding groove 110 of the mold is melted by the heating plate to be firmly attached to the inner side and outer side of the sock 10.

(Fourth Process)

A fourth process is a process of placing the mold 100 turned upside down on the sock 10 so as to come into contact with a nonslip member attachment portion of the sock 10 and inserting the same into the lower fixing plate of the press. Through the fourth process, the silicone melted by the heating device while in the nonslip member molding groove 110 of the mold 100 comes into contact with the nonslip member attachment portion of the sock 10. Here, a flat support plate is inserted into the sock 10 in advance so that the nonslip member attachment of the sock 10 is spread to be flat. Meanwhile, when the nonslip member 20 is attached to the inner side of the sock 10, the sock 10 is turned inside out and the support plate is inserted thereinto.

Here, the nonslip member attachment portion indicates a part of the inner side and outer side of the sock 10 which needs the nonslip member 20. The nonslip member attachment portion may generally be the inner side or outer side of the bottom of the sock 10 or an arch part and the like of the sock 10. In addition, the part of the sock 10 which needs the nonslip member 20 may be the nonslip member attachment portion.

Also, a thickness and a nonslip member pattern of the nonslip member attachment portion are applied depending on a position of being attached.

(Fifth Process)

A fifth process is a process of attaching the nonslip member 20 formed of silicone to the sock 10 by heat-pressing the mold 100 using an upper pressing plate of the press. Through the fifth process, the silicone melted by the heating device while being in the nonslip member molding groove 110 of the mold 100 is conjunctly pushed into a gap in a surface of the nonslip member attachment portion on the inner side or outer side of the sock 10 while simultaneously being conjunctly pressed against the surface by heat-pressing of the upper pressing plate to be firmly pressed thereagainst. Accordingly, the nonslip member 20 formed of silicone is firmly attached to the nonslip member attachment portion of the sock 10. Here, according to the present invention, since the upper pressing plate of the press heat-presses the mold 100 to attach the nonslip member formed of silicone to the sock 10, particularly, it is possible to also firmly attach the nonslip member 20 to the inner side of the sock 10 which is structurally fluffy.

A heater is built in each of the lower fixing plate and the upper pressing plate of the press. A cylinder moving up the upper pressing plate is installed above the press. A control portion controlling an operation of the upper pressing plate, a heat-pressing time, a temperature of the heater, and the like is installed below the press.

Accordingly, when the sock 10 on which the mold 100 is mounted is placed on the lower fixing plate while the upper pressing plate has been moved up and then the upper pressing plate is moved downward, since the upper pressing plate heat-presses the mold 100 to the sock 10 for 10 to 30 seconds while moving downward, the nonslip member 20 formed of silicone may be firmly and simply attached to the inner side or outer side of the sock. Here, since the upper pressing plate is automatically moved upward after the nonslip member 20 is completely attached, a subsequent attachment operation may be performed after the sock 10, to which the nonslip member 20 is attached, is extracted. While the sock 10, to which the nonslip member 20 is attached, has been extracted as described, when the nonslip member 20 is solidified and the mold 100 is extracted from the nonslip member 20, the operation is completed.

According to the present invention, as shown in FIGS. 3A, 3B, and 3C, the nonslip member 20 may be attached to any one of the inner side and outer side of the sock 10 or may be attached to each of the inner side and outer side. That is, the nonslip member 20 may be attached to only the outer side of the sock 10 as shown in FIG. 3A. Also, the nonslip member 20 may be attached to only the inner side of the sock 10 as shown in FIG. 3B. In addition, the nonslip member 20 may be attached to each of the outer side and inner side of the sock 10 as shown in FIG. 3C. Here, according to the present invention, a process of attaching the nonslip member 20 to the inner side of the sock 10 and a process of attaching the nonslip member 20 to the outer side of the sock 10 are formed as separate processes.

Although FIGS. 3A, 3B, and 3C illustrate states in which the nonslip member 20 is attached to a front of the bottom of the sock 10 as examples of the present invention, according to the present invention, the nonslip member 20 may be attached to each of parts which need the nonslip member 20 such as a rear of the bottom of the sock 10, an arch part of the sock 10, and the like.

Meanwhile, FIGS. 4A to 4M illustrate a variety of examples of the nonslip member 20 according to the present invention. According to the present invention, as shown in FIGS. 4A to 4M, the nonslip member 20 attached to the sock 10 may be formed to have a variety of shapes and patterns.

In a structure for attaching a nonslip member to each of both sides of a sock according to the present invention, as shown in FIGS. 1 to 4M as basic features of the technical components thereof, a nonslip member molding groove 110 is formed in a mold 100 configured to attach a desired-patterned nonslip member 20 to a part of a sock 10 which needs nonslip member, silicone which is a raw material of the nonslip member 20 is inserted into the nonslip member molding groove 110 of the mold, melting the silicone by inserting the mold 100 into a heating device, the mold 100 turned upside down is placed on the sock 10 to allow the silicone melted in the heating device to come into contact with a nonslip member attachment part of the sock 10 and is inserted into a lower fixing plate of a press (not shown), and the nonslip member 20 formed of silicone is attached to the sock 10 by heat-pressing the mold 100 using an upper pressing plate of the press.

Here, the sock 10 according to the present invention is applied to a general sock, a variety of sport socks, socks for fashion and climbing, and the like. The nonslip member 20 having a variety of patterns is firmly attached to a part of the inner side or outer side of the sock 10 which needs a nonslip member through the mold 100.

The nonslip member 20 is firmly attached to each of the inner side and outer side of the sock 10 through the mold 100, and the nonslip member 20 is formed of silicone. Here, the nonslip member 20 may be attached to each of the both sides of the sock 10 with a variety of shapes as shown in FIGS. 4A to 4M.

Also, in the present invention, even when a thread of the sock 10 is thick or fluffed or a thread weaving the sock 10 protrudes lengthwise therefrom, the nonslip member 20 is pressed against and melted to the sock 10 to be firmly attached thereto using the mold 100 instead of an existing sticker (decal) type or silk printing method.

According to the present invention, the nonslip member 20 includes the plurality of air holes 21. Here, since the nonslip member 20 includes the plurality of air holes 21 formed to be smoothly ventilated, the nonslip member 20 may be prevented from becoming wet during exercise such that it is possible to prevent a water membrane from being formed on the nonslip member 20 which destroys or degrades the nonslip member function.

According to the present invention, the nonslip member 20 may be attached to any one of the inner side and outer side of the sock 10 or may be attached to each of the inner side and outer side. Here, since the nonslip member 20 is attached to each of the inner side and outer side of the sock 10, it is possible to effectively prevent slipping between a foot and a sock and the sock and a shoe.

In the present invention configured as described above, when the nonslip member 20 is formed on the sock 10, silicone is inserted into the mold 100 and then heated and the mold 100 is placed on the sock 10 and pressed by the press so as to attach the nonslip member 20 to each of both sides using a molding method. Here, a thickness of the nonslip member 20 may be freely selected and attached to a rubbed part of a bottom of a foot according to an exercise event. Also, the present invention is applied to the sport sock 10, and there are effects of preventing a foot from slipping and being contorted during exercise and of minimizing a feeling of fatigue by absorbing a shock transferred to the foot.

Accordingly, in the present invention, since the nonslip member 20 formed of silicone is attached by heat-pressing the mold 100, in which silicone is inserted, against the sock 10, the nonslip member 20 having a variety of patterns may be firmly attached to a part of the inner side and outer side of the sock 10, which needs a nonslip member, by structurally using the mold 100. Particularly, since melted silicone is heat-pressed against the sock, an advantage of firmly attaching the nonslip member 20 even to the inner side of the sock 10 which is fluffy and an effect in which the nonslip member 20 is not separated from the sock while being washed is present.

Also, in the present invention, since the nonslip member 20 attached to the sock 10 includes the plurality of air holes 21 formed to be smoothly ventilated, it is possible to prevent the nonslip member 20 from becoming wet during exercise so as to provide an advantage of preventing a water membrane from being formed on the nonslip member 20 which destroys or degrades the nonslip member function.

Also, since the nonslip member 20 is formed by attaching the silicone inserted into the nonslip member molding groove 110 of the mold 100 to the sock 10 in the present invention, there is a structural advantage of adequately adjusting a thickness and a size of the nonslip member 20 according to a thickness and an area of the nonslip member molding groove 110 formed in the mold 100.

Also, since it is possible to attach the nonslip member 20 to a rubbed part of a bottom of a foot according to an exercise event, there are advantages of preventing blisters by decreasing a frictional coefficient generated for each of a variety of exercise events during exercise, preventing distortions of the foot and the sock 10 by applying the nonslip member to a sport sock during exercise, and providing improved workability and high quality at a competitive cost to consumers.

In addition, according to the present invention, there are advantages of completely remedying conventional problems including not only grip between the sock 10 and the floor but also a slipping phenomenon between a foot and the sock 10, providing a great effect in strengthening performance by increasing a sense of contact with a shoe during sport activities, reducing manufacturing costs so as to achieve excellent price competitiveness and durability, and being modifiable into a variety of designs.

Comparison among the both-sided nonslip member sock of the present invention configured as described above, an existing nonslip member sock of company W, and a general nonslip member sock is shown in Table 1 below.

TABLE 1

|  | Both-sided nonslip member sock according to present invention | Nonslip member sock of company W | General nonslip member sock |
| --- | --- | --- | --- |
| Manufacturing method | Fixing nonslip member to sock by molding using liquid resin | Printing and attaching sticker type nonslip member patch using press | General silk-screened nonslip member |
| Durability | Excellent | Excellent | Average |
| Advantages | Preventing slipping inside sock and remedying air permeability | Adsorption type nonslip member having high durability and being simply wearable | Common and low price |
| Disadvantages | About 250 pairs produced per day | Impossible to discharge sweat, high manufacturing cost, and high minimum quantity | Foot slips inside sock |

As seen from Table 1, in comparison to the nonslip member sock of W company and the general nonslip member sock, according to the both-sided nonslip member sock using a mold according to the present invention, since a nonslip member is formed on each of both sides of a sock or any one side of a sock using a mold in a manufacturing method, the nonslip member is fixed to the sock so that a cushioning property is improved, durability is not less than that of an existing pad type or silk screen printing, and air permeability is excellent.

| 10: sock | 20: nonslip member |
| --- | --- |
| 21: air hole | 100: mold |
| 110: nonslip member molding groove | 120: air hole molding pin |

The invention claimed is:

1. A method of attaching a desired-patterned nonslip member to both inner and outer sides of a sock, the method comprising:

manufacturing a mold including a nonslip member molding groove to attach the desired-patterned nonslip member to a part of the sock which needs the nonslip member;

inserting silicone which is a raw material of the nonslip member into the nonslip member molding groove of the mold;

melting the silicone by inserting the mold into a heating device;

placing the mold turned upside down on the sock to allow the silicone melted in the heating device to come into contact with a nonslip member attachment part of the sock and placing the mold on the sock on a lower fixing plate of a press;

attaching the nonslip member formed of the silicone to the sock by heat-pressing the mold using an upper pressing plate of the press;

turning inside out the sock with the nonslip member attached to an outer side of the sock, inserting a support plate thereinto; and placing the mold on the sock so as to allow the silicon melted to attach to an inner side of the sock and firmly attaching the nonslip member on the inner side and the outer side of the sock by heat-pressing the mold using the press, wherein the nonslip member molding groove of the mold comprises a plurality of air hole molding pins, the nonslip member comprises a plurality of air holes formed by the plurality of air hole molding pins, the plurality of air hole molding pins forms the plurality of air holes penetrating an entirety of a thickness of the nonslip member and extending to a bottom of the sock, the nonslip member includes an inner member and an outer member, the inner member is formed on the inner side of the sock and protrudes inward, the outer member is formed on the outer side of the sock and protrudes outward, the plurality of air holes includes air holes formed in the inner member and air holes formed in the outer member, and the air holes of the inner member are formed in positions corresponding to the air holes of the outer member, the air holes of the inner member facing the air holes of the outer member with the sock in between.

* * * * *